United States Patent [19]

Richmond

[11] 4,439,895

[45] Apr. 3, 1984

[54] OXIDE REFRACTORY MATERIAL HAVING FINE CRYSTAL STRUCTURE; AND PROCESS AND APPARATUS FOR MAKING SAME

[75] Inventor: Wesley Q. Richmond, Stevensville, Canada

[73] Assignee: Kennecott Corporation, Cleveland, Ohio

[21] Appl. No.: 403,987

[22] Filed: Aug. 2, 1982

Related U.S. Application Data

[63] Continuation of Ser. No. 920,577, Jun. 29, 1978, abandoned, which is a continuation of Ser. No. 565,978, Apr. 7, 1975, abandoned, which is a continuation of Ser. No. 452,226, Mar. 18, 1974, abandoned, which is a continuation of Ser. No. 153,302, Jun. 15, 1971, abandoned.

[51] Int. Cl.³ .......................... B01D 9/00; C09C 1/68
[52] U.S. Cl. .................... 23/305 A; 51/309; 425/6

[58] Field of Search .................. 51/309; 64/293; 23/295 R, 300, 305 A, 305 R; 264/37; 425/6

[56] References Cited

U.S. PATENT DOCUMENTS 2,802,236 8/1957 Nash ........................................ 264/28
3,781,172 12/1973 Pett et al. ............................... 264/60

*Primary Examiner*—Frank Sever
*Attorney, Agent, or Firm*—Raymond W. Green; Harold M. Snyder; R. Lawrence Sahr

[57] ABSTRACT

Oxide refractory materials (for example, alumina-zirconia mixtures) can be cast to have an extremely fine crystal structure by casting them onto a non-reactive, non-melting particulate solid cooling media of a material other than that of the oxide refractory material (for example, steel spheres having a size ranging from about 5 to about 60 mm). By using steel spheres as the cooling media, the spheres can be removed from the solidified material with a magnet. The solidified material, when crushed and graded, has exceptional utility as an extremely tough abrasive grain.

5 Claims, 2 Drawing Figures

OXIDE REFRACTORY MATERIAL HAVING FINE CRYSTAL STRUCTURE; AND PROCESS AND APPARATUS FOR MAKING SAME

CROSS REFERENCES TO RELATED APPLICATIONS

This is a continuation of application Ser. No. 920,577, filed June 29, 1978, which is a continuation of application Ser. No. 565,978, filed Apr. 7, 1975, which is a continuation of application Ser. No. 452,226, filed Mar. 18, 1974, which is a continuation of application Ser. No. 153,302, filed June 15, 1971, all now abandoned.

Commonly assigned U.S. patent application Ser. No. 153,318, filed June 15, 1971, by W. Q. Richmond and P. Cichy, now U.S. Pat. No. 3,928,515 and its divisional application Ser. No. 290,206, filed Sept. 18, 1972, now U.S. Pat. No. 3,861,849, relate to an improved process and apparatus, capable of semi-continuous operation, for making oxide refractory materials having a fine crystal structure. Commonly assigned U.S. patent application Ser. No. 153,315, filed June 15, 1971, by P. Cichy, now U.S. Pat. No. 3,726,621, and its divisional application Ser. No. 492,628, filed July 29, 1974, now U.S. Pat. No. 4,061,699, relate to another improved process and apparatus, capable of continuous operation, for making oxide refractory materials having a fine crystal structure.

The process disclosed in the present application is generically claimed in application Ser. No. 314,319, filed Dec. 12, 1972, as a division of application Ser. No. 153,302.

BACKGROUND OF THE INVENTION

This invention relates to oxide refractory material having a fine crystal structure; and a process and apparatus for making the same. Oxide refractory materials having a fine crystal structure are useful as refractory grain, or more particularly, as abrasive grain for inclusion in bonded abrasives such as grinding wheels and the like. For such grinding purposes, it is highly desirable for the abrasive grain to have as fine a crystal structure as possible, since this gives toughness to the abrasive grain. Previous methods of making abrasive grain having a fine crystal structure from oxide refractory materials have been successful in producing crystal sizes on the order of 100 to 300 microns. Finer crystal size and greater toughness are still desired, however. It is, therefore, an object of this invention to produce a new and improved oxide refractory material, useful as an abrasive grain, having a crystal structure finer than that heretofore available. Another object of this invention is to provide a novel process for producing such abrasive grain. Still another object is to provide novel apparatus for producing such grain. Other objects will be apparent from the specification.

SUMMARY OF THE INVENTION

According to the present invention, an oxide refractory melt is rapidly cooled and solidified to produce a solidified melt having a fine crystal structure. A solidification chamber is filled to a depth of at least about 15 cm with a non-reactive, non-melting particulate solid cooling media, of a material other than that of the oxide refractory material to be rapidly cooled and solidified. The preferred cooling media is steel spheres, ranging from about 5 to about 60 mm diameter. A melt of the oxide refractory material is cast into the solidification chamber, over the cooling media, whereby the melt is rapidly cooled and solidified. The cooling media and solidified melt are then recovered from the solidification chamber. If the oxide refractory material which is cast into the solidification chamber comprises at least two metal oxides which form a eutectic composition which melts at a temperature lower than those of the pure components, and if one or more metal oxides is present in amounts in excess of the eutectoid composition, the metal oxide which is present in amounts in excess of the eutectoid composition crystallizes out of the melt in extremely fine individual crystals. The remaining material, comprising the two oxide components in their eutectoid composition, then forms a dendritic crystal which contains the individual discontinuous crystals of the material which is present in amounts in excess of the eutectoid composition. The result is a continuous dendritic crystalline phase and a discontinuous crystalline phase, characterized by an extremely fine crystal size (for example, at least 90% by numerical count of the discontinuous crystals having a particle size smaller than about 40 microns). By an appropriate choice of the cooling media, grain having at least about 80% by numerical count of the discontinuous crystals having a particle size smaller than about 15 microns can be obtained, the remainder of the discontinuous crystals having a particle size ranging from about 15 to 40 microns.

DETAILED DESCRIPTION

Figure 1:
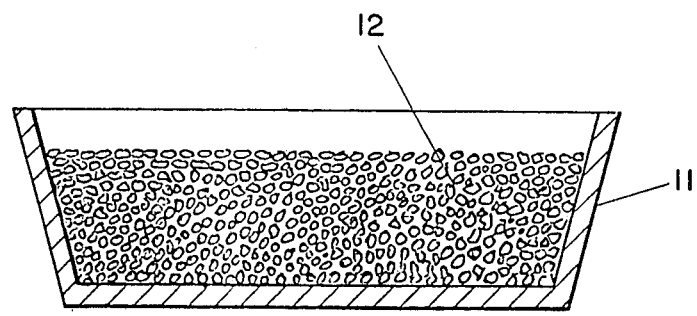
FIG. 1 represents a single solidification chamber containing cooling media intended for batch casting of oxide refractory material according to the present invention.

With reference to the drawings, FIG. 1 illustrates a solidification chamber 11 having an open top and a closed bottom, the chamber being about 18 cm deep and about 225 cm in diameter. The cooling media 12 is placed within the solidification chamber 11 to a depth of at least about 15 cm. The solidification chamber can be constructed of any material customarily used for molds for casting oxide refractory materials, such as cast iron, steel, or various ceramic refractory materials.

The criteria for the cooling media are several. First of all, the cooling media should be non-reactive with the oxide refractory material which is to be cast upon the cooling media. Secondly, the cooling media should be a non-melting particulate solid material other than the material of the oxide refractory material which is to be cast upon the cooling media. Whether the cooling media is non-melting with respect to a particular oxide refractory material which is to be cooled and solidified upon the cooling media can be determined by reference to the thermodynamic properties of the refractory material and the cooling media. To make this determination one needs to know the inlet temperature of the cooling media, the melting point of the cooling media, the solidification point of the oxide refractory material (i.e., the temperature at which solidification of the oxide refractory material is complete), the inlet temperature of the oxide refractory material (i.e., the temperature at which it is cast upon the cooling media), as well as the heat capacities of these materials and the heat of fusion of the oxide refractory material. Specifically, if the cooling media melting point is less than the solidification point of the oxide refractory material, the integral volumetric heat capacity of the cooling media in its solid state, from the cooling media inlet temperature to the cooling media point, must be greater than (1) the integral volumetric heat capacity of the oxide refractory material in its liquid state from its solidification point to the oxide refractory material inlet temperature, plus (2) the volumetric heat of fusion of the oxide refractory material. If the cooling media melting point is greater than the solidification point of the oxide refractory material, however, the integral volumetric heat capacity of the cooling media in its solid state, from the cooling media inlet temperature to the solidification point of the oxide refractory material, must be greater than (1) the integral volumetric heat capacity of the oxide refractory material in its liquid state from its solidification point to the oxide refractory material inlet temperature, plus (2) the volumetric heat of fusion of the oxide refractory material plus (3) the integral volumetric heat capacity of the refractory oxide material in its solid state from the cooling media melting point to the solidification point of the oxide refractory material. These relationships are set forth in thermodynamic terms in Formulas 1 and 2, respectively.

Formula 1 ($t_2 < t_3$):

$$\int_{t_1}^{t_2} McCcdt > \int_{t_3}^{t_4} MmC_{ml}dt + Mm\Delta H_{fm}$$

Formula 2 ($t_2 > t_3$):

$$\int_{t_1}^{t_3} McCcdt > \int_{t_3}^{t_4} MmC_{ml}dt + Mm\Delta H_{fm} + \int_{t_2}^{t_3} MmC_{ms}dt$$

where
- $t_1$ = cooling media inlet temperature
- $t_2$ = cooling media melting point
- $t_3$ = solidification point of oxide refractory material
- $t_4$ = oxide refractory material inlet temperature
- $Mc$ = weight of cooling media per unit volume as settled in solidification chamber
- $Cc$ = heat capacity of cooling media
- $Mm$ = weight of oxide refractory material per unit volume, as cast on to cooling media
- $C_{ml}$ = heat capacity of oxide refractory material, above its solidification point
- $C_{ms}$ = heat capacity of oxide refractory material below its solidification point, and
- $\Delta H_{fm}$ = heat of fusion of oxide refractory material.

Preferred, but not essential, properties of the cooling media include the following: The refractory media should have a relatively uniform size, so that the spaces between the cooling media (and therefore the size of the oxide refractory material as solidified) are about the same size; and the cooling media should preferably pack within the solidification chamber with a relatively predictable structure. The cooling media should preferably have a smooth surface so that the solidified melt does not stick to the surface of the cooling media after solidification. In order to facilitate separation of the cooling media from the solidified oxide refractory material, it is preferred that the cooling media be magnetic, so that the cooling media can be merely removed with a magnet after solidification of the oxide refractory material. In order to be capable of repeated use, the cooling media should be tough and heat shock resistant. Accordingly, the preferred cooling media for use in the present invention comprises metallic spheres of approximately uniform size (e.g., within about 20%). In particular, it is preferred that carbon steel be used as the cooling media. The size of the spheres affects the rate of cooling and consequently the crystal size and friability of the solidified oxide refractory material. Accordingly, it is preferred that the steel spheres range in size from about 5 to about 60 mm. Smaller spheres cool the melt more rapidly, but steel spheres which are smaller than about 5 mm are more difficult to remove from the solidified oxide refractory material. Within this range it is preferred to utilize steel spheres having a diameter ranging from about 12 to about 40 mm; and those ranging in size from about 18 to about 32 millimeters are even more preferred. Other cooling media which can be used include lumps of graphite or ferrosilicon.

Referring again to FIG. 1, there is illustrated a solidification chamber 11 containing a layer of steel sphere cooling media 12. The solidification chamber 11 is approximately 18 cm deep and about 225 cm in diameter. The steel spheres are filled to a depth of about 15 cm. Solidification chamber 11 is a closed bottom molding pan, intended for batch molding or serial batch molding of oxide refractory material. It is preferred that solidification chamber 11 be slowly rotated while oxide refractory material is cast into the solidification chamber 11, over the cooling media 12. The speed of rotation can be, for example, from about 3 to about 10 rpm. This rotation helps prevent local overheating of the cooling media 12. After the melt is cast over the cooling media, thereby being rapidly cooled and solidified, the cooling media and solidified melt are recovered. The solidified melt can then be crushed and graded for size according to conventional means, for inclusion in bonded abrasive articles such as grinding wheels.

Figure 2:
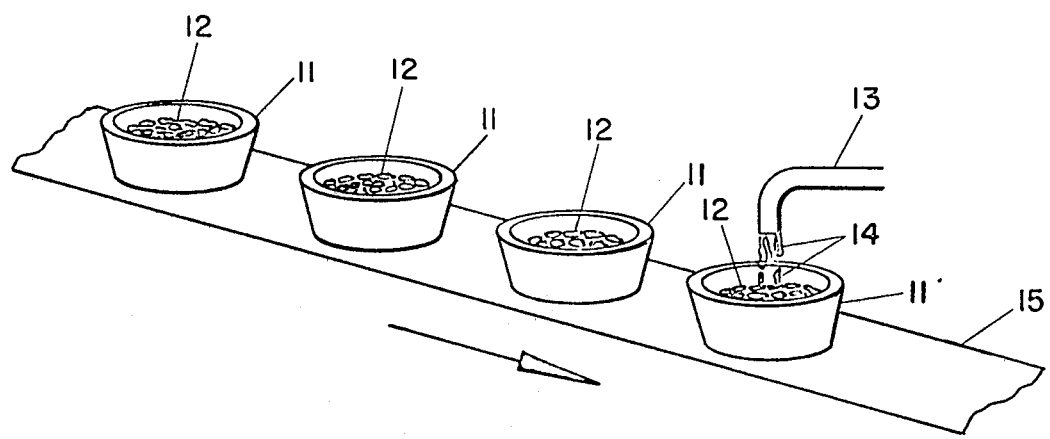
FIG. 2 illustrates a plurality of such solidification chambers, carried by means of a conveyor belt to the source of the melt of oxide refractory material to be cast onto the cooling media contained within the solidification chambers.

In a preferred embodiment of the present invention, a series of closed bottom solidification chambers is utilized as illustrated in FIG. 2. Source 13 of oxide refractory material 14 is positioned over the cooling media 12 within soldification chamber 11. It is preferred for the present invention to provide means 15, such as a conveyor belt, for moving the solidification chamber 11 to the source 13 of oxide refractory material 14. It is equally within the scope of the invention, however, to provide means for moving the source 13 of oxide refractory material 14 to the various solidification chambers 11.

Although the invention is illustrated with examples of alumina-zirconia mixtures, pure alumina or zirconia can be used, or various other oxide refractory materials. In order to obtain the crystallization out of crystals of one oxide which is to be surrounded by eutectic mixtures of that oxide and a second oxide, it is necessary to start with a mixture of oxides which form a eutectic; but the apparatus and process are equally applicable to mixtures which do not form eutectics or to pure oxides.

The invention will now be illustrated with several examples.

EXAMPLE 1

A solidification chamber (molding pen) 11 about 18 cm in depth and about 2.25 meters in diameter was filled to a depth of about 15 cm with carbon steel spheres 12 having a diameter of approximately 50 mm. A homogeneous mixture having the following composition was melted:

| | |
|---|---|
| Zirconia | 27.63% by weight |
| Titania | 1.07 |
| Silica | 0.80 |
| Iron Oxide (Fe$_2$O$_3$) | 0.23 |
| Magnesia | 0.13 |
| Sodium Oxide | 0.03 |
| Carbon | 0.035 |
| Alumina | Balance |
| | 100.00% |

This melt was cast upon steel spheres 12. The zirconia-alumina mixture immediately solidified, and upon solidification a sample of the solidified material was examined by photomicrograph. The solidified material had shrunk approximately 25% by volume upon solidification, so that upon solidification it broke up into small pieces having a size approximating from 1 to 3 times the size of the steel spheres 12. The photomicrograph of the sample of the solidified alumina-zirconia material revealed that on a numerical count basis, only 3% of the crystals of alumina which had crystallized out of the mixture first had a particle size (maximum dimension) of over 40 microns. 47% of the alumina crystals had a particle size ranging from 15 to 40 microns. 50% of the alumina crystals had a particle size under 15 microns. Between the crystals of alumina described above, the alumina-zirconia eutectic solidified in dendritic crystals surrounding the alumina crystals, such that the crystalline structure of the solidified alumina-zirconia mixture comprised a continuous crystalline phase of eutectic and a discontinuous crystalline phase of alumina.

EXMPLE 2

Example 1 was repeated, using steel spheres approximately 38 mm in diameter. Again a photomicrograph was taken of the sample material, and it revealed that none of the alumina crystals had a particle size in excess of 40 microns; 18% of the alumina crystals had a particle size ranging from 15 to 40 microns; and 82% of the alumina crystals had a particle size under 15 microns.

EXAMPLE 3

Example 1 was again repeated, using steel spheres having a diameter of approximately 32 mm. Again a photomicrograph was taken and it revealed that none of the alumina crystals had a particle size in excess of 40 microns; 14% of the alumina crystals ranged between 15 and 40 microns; and 80% of the alumina crystals were under 15 microns in particle size.

I claim:

1. Apparatus for rapidly cooling and solidifying an oxide refractory melt, comprising:
   (1) a solidification chamber having a closed bottom;
   (2) a static bed of non-reactive, non-melting particulate solid steel sphere cooling media, said cooling media having a size ranging from about 5 to about 60 mm, packed within and filling the solidification chamber to a depth of at least about 15 cm;
   (3) means for casting the oxide refractory melt into the solidification chamber, over the steel sphere cooling media, after the steel sphere cooling media are packed within the solidification chamber, said size, the composition of said steel and sizing of said means, being preselected to provide a grain having at least about 80% by numerical count of discontinous crystals having a size smaller than about 15 microns and the remainder of the discontinuous crystals having a size ranging from about 15 to 40 microns; and
   (4) a magnet for recovering the cooling media from the solidified melt.

2. Apparatus according to claim 1, wherein a plurality of closed bottom solidification chambers are provided, and comprising in addition means for moving the solidification chambers to the source of the melt of oxide refractory material.

3. Apparatus according to claim 1, wherein a plurality of closed bottom solidification chambers are provided, comprising in addition means for moving the source of melt of oxide refractory material to the solidification chambers.

4. Apparatus for rapidly cooling and solidifying an oxide refractory melt, comprising:
   (1) a solidification chamber having a closed bottom;
   (2) a static bed of non-reactive, non-melting particulate solid steel sphere cooling media, said cooling media having a size ranging from about 5 to about 60 mm, packed within and filling the solidification chamber to a depth of at least about 15 cm;
   (3) means for casting the oxide refractory melt into the solidification chamber, over the steel sphere cooling media, after the steel sphere cooling media are packed within the solidification chamber, said size, the composition of said steel and sizing of said means, being preselected to provide a grain having at least about 80% by numerical count of discontinuous crystals having a size smaller than about 15 microns and the remainder of the discontinuous crystals having a size ranging from about 15 to 40 microns; and
   (4) means for moving the solidification chamber to the source of the melt of oxide refractory material.

5. Apparatus for rapidly cooling and solidifying an oxide refractory melt, comprising:
   (1) a solidification chamber having a closed bottom;
   (2) a static bed of non-reactive, non-melting particulate solid steel sphere cooling media, said cooling media having a size ranging from about 5 to about 60 mm, packed within and filling the solidification chamber to a depth of at least about 15 cm;
   (3) means for casting the oxide refractory melt into the solidification chamber, over the steel sphere cooling media, after the steel sphere cooling media are packed within the solidification chamber, said size, the composition of said steel and sizing of said means, being preselected to provide a grain having at least about 80% by numerical count of discontinuous crystals having a size smaller than about 15 microns and the remainder of the discontinuous crystals having a size ranging from about 15 to 40 microns; and
   (4) means for moving the source of the melt of oxide refractory material to the solidification chamber.

* * * * *